United States Patent [19]

Abert-Mellah et al.

[11] 4,110,243

[45] Aug. 29, 1978

[54] ALKYLPHENYL 3-CYANO OR FLUORO-4-ALKYLOXYBENZOATES AND MESOMORPHIC MIXTURES THEREOF

[75] Inventors: Marie Annick Abert-Mellah; Jean Claude Dubois; Annie Zann, all of Paris, France

[73] Assignee: Thomson-CSF, Paris, France

[21] Appl. No.: 680,772

[22] Filed: Apr. 27, 1976

[30] Foreign Application Priority Data

Apr. 30, 1975 [FR] France .................. 75 13617

[51] Int. Cl.² .................... C07C 69/84; C07C 121/75; C09K 3/34
[52] U.S. Cl. ................ 252/299; 260/465 D; 260/521 H; 260/544 D; 350/350; 560/65
[58] Field of Search .............. 260/465 D, 473 R; 252/299; 560/65

[56] References Cited

U.S. PATENT DOCUMENTS

| | | | |
|---|---|---|---|
| 3,876,286 | 4/1975 | Deutscher et al. ............. | 260/473 R |
| 3,915,883 | 10/1975 | Van Meter et al. ............. | 252/299 |
| 3,953,491 | 4/1976 | Steinstrasser et al. .......... | 260/465 D |
| 3,976,591 | 8/1976 | Dubois et al. ................ | 252/299 |

*Primary Examiner*—Dolph H. Torrence
*Attorney, Agent, or Firm*—Oblon, Fisher, Spivak, McClelland & Maier

[57] ABSTRACT

An organic compound having a high negative dielectric anisotropy is capable, by mixing with a nematic liquid crystal, of improving the dynamic scattering effect of the liquid crystal. The organic compounds have the formula:

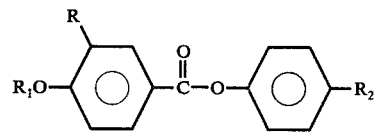

in which R is either a fluoro or a nitrile radical and wherein $R_1$ and $R_2$ are alkyl radicals. An excellent dynamic scattering effect is obtained by mixing the new organic compound even in a low proportion with a nematic liquid crystal.

4 Claims, No Drawings

ALKYLPHENYL 3-CYANO OR FLUORO-4-ALKYLOXYBENZOATES AND MESOMORPHIC MIXTURES THEREOF

BACKGROUND OF THE INVENTION

1. Field of the Invention

The invention relates to a new organic compound (prototype of a family of compounds differing from each other only by a radical F or C≡N and by organic radicals of formula $C_nH_{2n+1}$) capable, by mixing with a species having a mesomorphic phase, of constituting a liquid crystal having a high dynamic scattering of light.

2. Description of the Prior Art

It is known that certain liquid crystals, within the temperature range in which they are in a mesomorphic phase exhibit a dynamic scattering effect when they are subjected to a continuous or alternating electric field. This effect is employed in the electro-optical and visualization field.

Among the capabilities required of dynamic scattering liquid crystals, the importance of the following must be emphasized:
the contrast effect;
the life of the liquid crystal in particular in a continuous electric field.

The principle used to obtain a liquid crystal having a high dynamic scattering effect is based on the fact that in mixing a nematic liquid crystal with a small amount of a species having a high negative dielectric anisotropy, which is the case of organic compounds of formula (1), the desired effect is reinforced, which effect already exists, to a lesser degree, in the nematic liquid crystal in the pure state.

SUMMARY OF THE INVENTION

Accordingly, one object of the present invention is to provide a method for preparation of novel organic compounds having the formula:

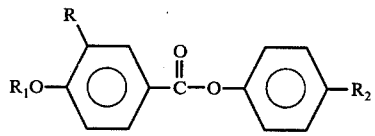

(1)

wherein R is a fluoro or a nitrile radical, and wherein $R_1$ and $R_2$ are alkyl radicals $C_nH_{2n+1}$, wherein n is an integer of 1 to 9.

Another object of the present invention is to enable the preparation of mixtures of the novel compounds with nematic liquid crystals, such mixtures having both an improved contrast effect and a longer lifetime for the liquid crystal, in particular in a continuous electric field.

DESCRIPTION OF THE PREFERRED EMBODIMENTS

The synthetic preparation of an organic compound according to the invention is achieved by esterifying an acid chloride of formula:

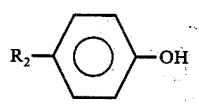

with a phenol of formula:

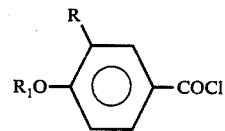

wherein R, $R_1$ and $R_2$ are as defined above.

The general mechanism of the process for preparing compounds according to the invention will be given hereinafter followed by the mode of carrying out the main steps.

A prelimary step comprises preparing a phenol of formula (3) from aniline, in the known manner, as shown in the following reaction diagram

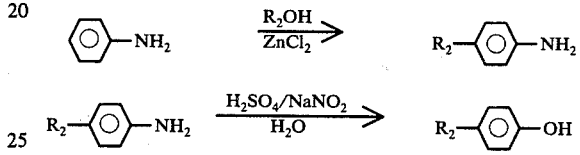

In a main first step, an acid chloride of formula (2) is prepared from the compound:

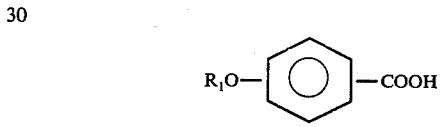

The reaction diagram is the following (it will be understood better with the hereafter cited examples):

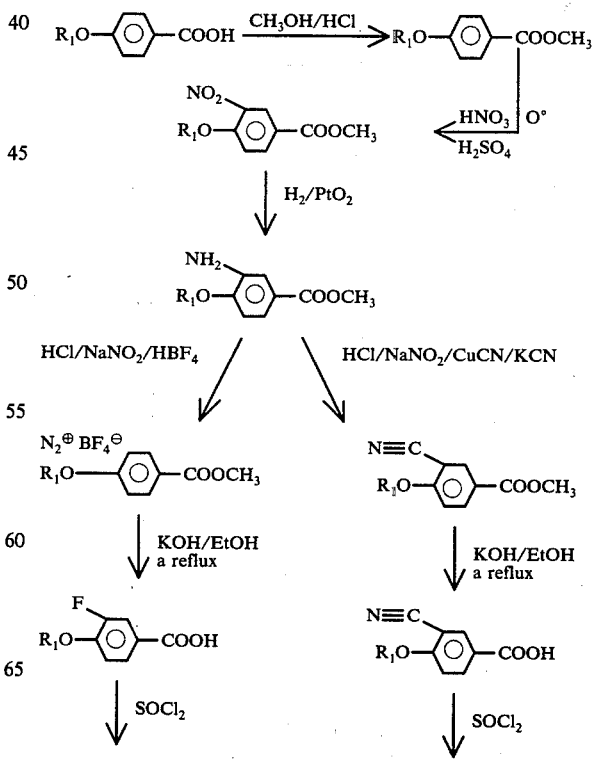

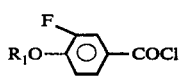  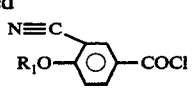

In the foregoing reaction diagram the notations are of the type usually employed in chemistry; in particular the designation EtOH is an abreviation of $C_2H_5OH$.

In a second main step, the condensation of the acid chloride and the phenol occurs in a pyridine medium. The reaction is slow (several days). The esters are formed with liberation of H Cl.

FIRST MAIN STEPS: EXAMPLES

Example No. 1: preparation of 3 cyano 4 octyloxy benzoyl chloride;

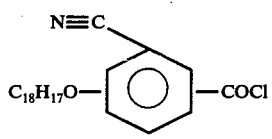

Sub-step (a):

Starting with octyloxy benzoic acid 150 cc of methanol previously saturated by H Cl gas are added to 0.2 mole of this acid. The reaction is carried out in an atmosphere of H Cl while refluxing the methanol. The raw ester is separated out, washed to neutrality and purified by recrystallization from methanol.

47.6 g of methyl 4-octyloxybenzoate are obtained.

Sub-step (b)

Starting with the product obtained in the preceding sub-step.

35g (0.132 mole) of this product are added to 42.5 cc of $H_2SO_4$ of density 1.84 (98%). The mixture is cooled to 0° C and then, while maintaining the temperature at between 0° and 10° C, there is added a mixture of 10.6 cc of $H_2SO_4$ of the same concentration as above and 8 cc of $HNO_3$ of density 1.40. Stirring is maintained for fifteen minutes and then the mixture is poured onto 100g of crushed ice and stirred. The raw ester separates out as a light yellow solid. It is filtered, washed with water, stirred with iced methanol and recrystallized from methanol.

25 g of methyl 3-nitro-4-octylbenzoate are obtained.

Sub-step (c) Starting with the product obtained in the preceding sub-step.

20 g of this product are dissolved cold in 1 liter of a 9/1 mixture of ethanol/ethyl acelate. 200 mg of $PtO_2$ are added. The reaction is carried out in a hydrogen atmosphere until the absorption of hydrogen is nil. After filtration of the platinum (resulting from the reduction of $PtO_2$) on infusorial earth, the reaction solvent is evaporated. The product obtained is recrystallized from ethanol.

14 g of methyl 3-amino-4 octyloxybenzoate are obtained.

Sub-step (d)

Starting with the product obtained in the preceding step.

0.007 mole of this product is added to 0.78 g of 25% HCl (278g/l). The amine hydrochloride obtained is cooled to − 5° C and there is added, drop by drop, 0.007 mole of $NaNO_2$ in 10 cc of water. The diazonium salt obtained is added to a mixture of 0.02 mole of K C N and 0.01 mole of $C_u$ C N dissolved in water and heated to a temperature of about 60° to 70° C. The mixture is then reflux heated for fifteen minutes. The raw product is extracted with ether, then purified by recrystallization. It is then saponified by 10 g of K O H in 100 cc of ethyl alcohol. After acidifying by the progressive addition of H Cl, the acid produced is extracted with hot benzene and then treated with animal black. The product is recrystallized from benzene.

3 cyano 4 octyloxy benzoic acid is obtained.

Sub-step (e)

Starting with the product obtained in the preceding sub-step.

1.5 g (0.0054 mole) of this product are added to 5.26 g (0.05 mole) of $SOCl_2$. The mixture is reflux heated. The excess $SOCl_2$ is distilled under vacuum. The acid chloride crystallizes. It is recrystallized from a mixture of benzene and hexane (1/1).

3 cyano 4 octyloxy benzoyl chloride is obtained.

Example No. 2

Preparation of 3 fluoro 4 octyloxy benzoyl chloride:

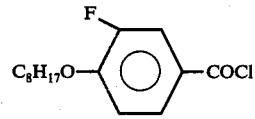

The sub-steps (a), (b) and (c) are identical to those of Example No. 1.

Sub-step (d)

Starting with methyl 3-amino-4-octyloxybenzoate obtained in step (c).

5 g (0.018 mole) of this product are added to 1.96 g of H Cl at 25%. The amine hydrochloride obtained is cooled to −5° C. There are then added, drop by drop, 1.38 g (0.20 mole) of $NaNO_2$ in 10 cc of water. 2.63 g (0.03 mole) of $HBF_4$ are added (clear light yellow diazonium salt). A diazonium fluoroborate precipitate is produced which is maintained at low temperature for two hours and then washed with a mixture of water and ether methanol in the proportions 2-1-2. The precipitate is dried and then decomposed by heat. The methyl 3 fluoro-4 octyloxy benzoate of methyl is then partly sublimated. It is saponified with 10 g of potash in 10 cc of ethyl alcohol. It is then acidified by progressively adding H Cl. The acid is extracted with benzene and then treated with animal black. It is recrystallized from benzene.

3 fluoro 4 octyloxy benzoic acid is obtained.

Sub-step (e)

This step is similar to sub-step (e) of Example No. 1.

Second main step: forming the esters (1) Mode of operation:

10 cc of pyridine are charged with 0.001 mole of phenol and 0.0014 mole of acid chloride. They are left in contact for several days and then treated by pouring them into a mixture of 2 ml. of $H_2SO_4$ and 20g of crushed ice; the mixture is stirred for one hour. The organic product is extracted and washed to neutrality. As the ester forming reaction is usually incomplete, the esters are purified by chromatography on a column of silica and then by recrystallization.

(2) Examples of esters of type:

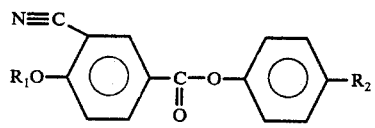

Table I gives, for six examples numbered 1.1 to 1.6, the radicals $R_1$ and $R_2$, of the above formula, the melting point F.Pin degrees centigrade, and the point S/I of the passage from the smectic state to the isotropic state (also in degrees centigrade), it being understood that in the latter case the point F.Pis that of the passage from the solid state to the liquid crystal state.

TABLE I

| N° of the example | $R_1$ | $R_2$ | F.P | S/I |
|---|---|---|---|---|
| 1.1 | $CH_3$ | $C_5H_{11}$ | 67, 5° C | — |
| 1.2 | $C_4H_9$ | $C_5H_{11}$ | 69° C | — |
| 1.3 | $C_8H_{17}$ | $C_5H_{11}$ | 46° C | 52° C |
| 1.4 | $CH_3$ | $C_7H_{15}$ | 71° C | — |
| 1.5 | $C_4H_9$ | $C_7H_{15}$ | 58° C | — |
| 1.6 | $C_8H_{17}$ | $C_7H_{15}$ | 47° C | 57° C |

(3) Examples of esters of the type:

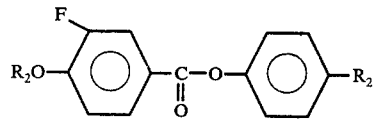

TABLE II

| N° of the example | $R_1$ | $R_2$ | F.P |
|---|---|---|---|
| 2.1 | $CH_3$ | $C_5H_{11}$ | 78° C |
| 2.2 | $C_4H_9$ | $C_5H_{11}$ | 73° C |
| 2.3 | $C_8H_{17}$ | $C_5H_{11}$ | 71° C |
| 2.4 | $CH_3$ | $C_7H_{15}$ | 80° C |
| 2.5 | $C_4H_9$ | $C_7H_{15}$ | 72° C |
| 2.6 | $C_8H_{17}$ | $C_7H_{15}$ | 69° C |

In the examples of Table II, no compound exhibits a smectic phase.

Excellent results are obtained by mixing one of the esters of Tables I and II with a nematic liquid crystal in an optimum proportion of 5% by weight of ester for 95% of nematic product, in particular in the case of 4' pentylphenyl 4 methoxybenzoate:

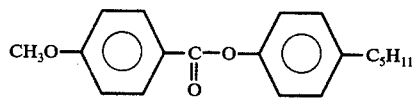

Table III gives the result of measurements effected on binary mixtures having 5% of ester. In this table the designations are:

$\Delta\epsilon$ max: the maximum dielectric anisotropy of the mixture;

$\rho$: the resistivity in Ohms:meters;

$t_m$ and $t_d$: the rise and fall times in milliseconds of a pulse in response to a rectangular pulse of 20 V applied for 1500 ms at the rate of 0.33 c/s;

$V_p$: the voltage in millivolts of the response signal of a photodiode subjected to a light pulse from the liquid crystal.

In the last line of the table there are shown the results of analogous measurements effected on a nematic product which is a commercially available reference product (reference: Eastman Kodak 11643, a commercially available nematic mixture useful for dynamic scattering, with a nematic range of 9°–99° C and resistivity (at 35.4 $V_{rms}$, 500Hz, 23° C) of $2.9 \times 10^9$ ohm-cm.)

TABLE III

| 5% ester : N° of the Ex. of preceding tables | $\Delta\epsilon_{max}$ | $\rho$ | $t_m$ | $t_d$ | $V_p$ |
|---|---|---|---|---|---|
| 1.3 | −0.35 | | 20 | 240 | 140 |
| 2.3 | −0.06 | $10^8$ | 20 | 320 | 140 |
| 2.4 | −0.07 | $7.10^7$ | 160 | 280 | 65 |
| 1.5 | | $3.10^7$ | 240 | 200 | 55 |
| 2.1 | −0.07 | $2.10^7$ | 20 | 240 | 130 |
| Commercial nematic product | | $1.3.10^7$ | 20 | 140 | 65 |

For the examples 1.3, 2.3 and 2.1, the contrast effect resulting from the dynamic scattering of the light is greater as shown by the values of $V_p$, compared to the value observed with the commercially available nematic product.

The stability of the above mixtures is excellent and in particular better than that of conventional nematic products.

The life of the cells having a liquid crystal comprising the compounds according to the invention is increased over conventional liquid crystals in particular in devices controlled by continuous voltages.

What we claim is:

1. A compound of the formula:

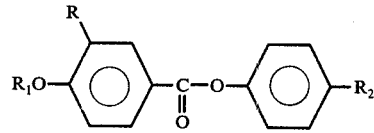

in which R is a fluoro or a nitrile radical, and wherein $R_1$ and $R_2$ are alkyl radicals ($C_nH_{2n+1}$) with $n$ being an integer of 1 to 9.

2. A mesomorphic mixture comprising (a) an organic compound of the formula:

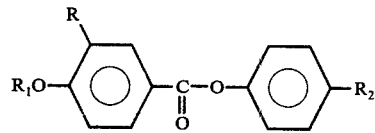

wherein R is a fluoro or a nitrile radical, and wherein $R_1$ and $R_2$ are alkyl radicals ($C_nH_{2n+1}$) with n being an integer of 1 to 9; and (b) a liquid nematic crystal; wherein said organic compound (a) is present in an amount effective for improving the scattering effect of said liquid nematic crystal in said mesomorphic mixture; and wherein said liquid nematic crystal is 4'-pentylphenyl 4-methoxybenzoate.

3. The mixture as claimed in claim 2, wherein
$R_2 = C_5H_{11}$
$R_1 = CH_3$ or $C_4H_9$ or $C_8H_{17}$ 4. The mixture as claimed in claim 2, wherein
$R_2 = C_7H_{15}$
$R_1 = CH_3$ or $C_4H_9$ or $C_8H_{17}$

* * * * *